United States Patent
Nakamura et al.

(10) Patent No.: US 9,927,817 B2
(45) Date of Patent: Mar. 27, 2018

(54) THROTTLE VALVE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Akio Nakamura, Okazaki (JP); Akira Nakano, Okazaki (JP); Shusuke Inagi, Toyota (JP); Akira Yamashita, Toyota (JP); Masaaki Kondo, Owariasahi (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/922,985

(22) Filed: Oct. 26, 2015

(65) Prior Publication Data

US 2016/0116918 A1  Apr. 28, 2016

(30) Foreign Application Priority Data

Oct. 28, 2014  (JP) .................................. 2014-219384

(51) Int. Cl.
*G05D 7/00* (2006.01)
*B60K 15/03* (2006.01)
*F17C 13/04* (2006.01)

(52) U.S. Cl.
CPC ............... *G05D 7/00* (2013.01); *B60K 15/03* (2013.01); *F17C 13/04* (2013.01);
(Continued)

(58) Field of Classification Search
CPC ............ G05D 7/00; B60K 15/03; F17C 13/04
(Continued)

(56) References Cited

U.S. PATENT DOCUMENTS 2,234,932 A * 3/1941 Schlaupitz ........... F02M 59/462
  137/516.27
2,912,001 A * 11/1959 Green .................... F16K 15/063
  137/516.29
(Continued)

FOREIGN PATENT DOCUMENTS

EP  2833037 A2  2/2015
GB  1517616 A *  7/1978  ............. F16K 1/305
(Continued)

OTHER PUBLICATIONS

JP 2014-202254 published Oct. 27, 2014 Nishio et al.*
(Continued)

*Primary Examiner* — Craig Schneider
*Assistant Examiner* — Frederick D Soski
(74) *Attorney, Agent, or Firm* — Oliff PLC

(57) ABSTRACT

A throttle valve includes a throttle valve element; a support member that supports the throttle valve element, the support member including a valve element support portion, and a shaft portion that is connected to the valve element support portion, the shaft portion having a gas passage and an inlet port; a mounting member that mounts the support member in a throttle valve flow passage; a filter that is disposed on an outer peripheral surface of the shaft portion to cover the inlet port, in a space whose axial length is defined by the shaft portion and the mounting member; and gaskets that are respectively disposed between one axial end of the filter and the mounting member and between the other axial end of the filter and the shaft portion.

3 Claims, 3 Drawing Sheets

(52) U.S. Cl.
CPC ............ *B60K 2015/03296* (2013.01); *B60K 2015/03315* (2013.01); *F17C 2205/035* (2013.01); *F17C 2205/0323* (2013.01); *F17C 2205/0335* (2013.01); *F17C 2205/0341* (2013.01); *F17C 2205/0382* (2013.01); *F17C 2205/0394* (2013.01); *F17C 2221/012* (2013.01); *F17C 2223/0123* (2013.01); *F17C 2223/036* (2013.01); *F17C 2270/0168* (2013.01); *F17C 2270/0184* (2013.01); *Y02E 60/321* (2013.01); *Y10T 137/7839* (2015.04)

(58) Field of Classification Search
USPC .......................................................... 137/538
See application file for complete search history.

(56) References Cited

U.S. PATENT DOCUMENTS

| | | | | |
|---|---|---|---|---|
| 2,949,930 A | * | 8/1960 | Moore, Jr. | E21B 34/08 137/516.29 |
| 3,255,774 A | * | 6/1966 | Gallagher | F16K 17/06 137/516.29 |
| 3,552,421 A | * | 1/1971 | Yocum | F16K 41/023 137/321 |
| 4,213,021 A | * | 7/1980 | Alexander | F16K 37/0033 137/540 |
| 4,611,628 A | * | 9/1986 | Pasternack | F16K 1/305 137/509 |
| 4,791,957 A | * | 12/1988 | Ross | F17C 13/04 137/505.12 |
| 5,299,598 A | * | 4/1994 | Quartana, III | F16K 1/38 137/516.29 |
| 5,785,082 A | * | 7/1998 | Geis | F17C 13/04 137/516.29 |
| 8,069,876 B2 | * | 12/2011 | Kane | F16K 15/026 137/538 |
| 8,104,508 B2 | * | 1/2012 | Suzuki | F16K 1/303 137/614.2 |
| 2006/0196553 A1 | * | 9/2006 | Kane | F16K 15/026 137/538 |
| 2008/0308181 A1 | * | 12/2008 | Denis | F17C 13/04 141/360 |
| 2010/0206403 A1 | * | 8/2010 | Kuroyanagi | F16K 1/308 137/511 |
| 2013/0025713 A1 | * | 1/2013 | Smith, III | F16K 17/168 137/539 |
| 2014/0318642 A1 | * | 10/2014 | van der Klift | F16K 17/168 137/505.11 |
| 2015/0034195 A1 | | 2/2015 | Shima et al. | |
| 2016/0018013 A1 | | 1/2016 | Nishio et al. | |
| 2016/0102771 A1 | * | 4/2016 | Kuroyanagi | F17C 13/04 137/540 |
| 2016/0116918 A1 | * | 4/2016 | Nakamura | G05D 7/00 137/544 |
| 2016/0131273 A1 | * | 5/2016 | Onishi | F16K 27/0209 220/86.1 |
| 2016/0312902 A1 | * | 10/2016 | Miyake | F17C 13/04 |

FOREIGN PATENT DOCUMENTS

| | | | | |
|---|---|---|---|---|
| JP | 2013-029160 A | | 2/2013 | |
| JP | 2013-029161 A | | 2/2013 | |
| JP | 2014-202254 | * | 4/2013 | ......... F16K 17/0433 |
| WO | 2014/163131 A1 | | 10/2014 | |

OTHER PUBLICATIONS

Machine translation for above JP 2014-202254.*
Nishio et al., Check valve element and check valve using the same, Oct. 27, 2014, machine translation of application No. 2013-077539.*
Apr. 5, 2016 Search Report issued in European Patent Application No. 15191479.3.

* cited by examiner

THROTTLE VALVE

INCORPORATION BY REFERENCE

The disclosure of Japanese Patent Application No. 2014-219384 filed on Oct. 28, 2014 including the specification, drawings and abstract is incorporated herein by reference in its entirety.

BACKGROUND OF THE INVENTION

1. Field of the Invention

The invention relates to a throttle valve.

2. Description of Related Art

Conventionally, in a gas tank provided in a fuel cell vehicle or the like, a valve device is provided to control the supply of high-pressure hydrogen gas into the tank, and the discharge of the high-pressure hydrogen gas stored inside the tank. The valve device includes a body in which a gas flow passage is provided, the gas flow passage providing communication between the inside and the outside of the gas tank; and a valve mechanism that controls the flow of the hydrogen gas through the gas flow passage. The gas flow passage is connected to a pipe extending from an external device (for example a supply source that supplies the hydrogen gas) via a joint fitted to the body (for example, refer to Japanese Patent Application Publication No. 2013-29161 (JP 2013-29161A).

More specifically, as shown in FIG. 6, in a valve device described in JP 2013-29161A, a body 121 has an fitting hole 123 into which a joint 122 is fitted. The body 121 also has a supply passage 124 that is opened to the bottom surface of the fitting hole 123, and that serves as a gas flow passage through which hydrogen gas is supplied into a gas tank.

A check valve 132 is provided in the supply passage 124. The check valve 132 suppresses the discharge (release) of hydrogen gas to the outside through the fitting hole 123. When hydrogen gas is not supplied, the check valve 132 suppresses the discharge of hydrogen gas from the supply passage 124 in the following manner. A valve element 137 is urged toward a valve seat 136 by the pressure of hydrogen gas and the urging force of an urging member 138 and is seated at the valve seat 136 to close a valve orifice 135 of the valve seat 136.

As shown in FIG. 6, the joint 122 is formed such that a throttle valve 141, a filter 142, a support member 143, and the like, are fitted to a joint body 140. The joint 122 has a through hole 147. The through hole 147 includes a large-diameter portion 144, a taper portion 145 and a small-diameter portion 146 in the stated order from the body 121-side toward a pipe 125. The taper portion 145 functions as a throttle valve seat, and the taper portion 145-side opening of the small-diameter portion 146 is a throttle valve orifice of the throttle valve seat.

The throttle valve 141 includes a throttle valve element 149, a valve chamber forming member 150 and a coil spring 151. The throttle valve element 149 is provided so as to make contact with and separate from the taper portion 145 (the throttle valve seat). The valve chamber forming member 150 defines a valve chamber in which the throttle valve element 149 is accommodated. The coil spring 151 urges the throttle valve element 149 toward the taper portion 145 (the throttle valve seat). The distal end of the throttle valve element 149 has a taper surface. The taper surface makes contact with and separates from the taper portion 145 (throttle valve seat).

The support member 143 is fitted into the large-diameter portion 144, and has an axial hole 148 that communicates with the valve orifice 135. The filter 142 has a cylindrical shape. Both ends of the filter 142 are respectively fitted to the outer peripheral surface of a support portion of the support member 143 and the outer peripheral surface of a small cylindrical portion of the valve chamber forming member 150. A gasket 152 in a compressed state is disposed between one of the ends of the filter 142 and the support member 143, and another gasket 152 in a compressed state is disposed between the other of the ends of the filter 142 and the valve chamber forming member 150. The valve chamber forming member 150 has a slit for providing communication between the small-diameter portion 146 and the large-diameter portion 144 at the time when the throttle valve element 149 moves in a valve opening direction. Each of the filter 142, the support member 143 and the valve chamber forming member 150 is made of metal.

In the thus configured valve device, hydrogen gas is supplied from the pipe 125 to the supply passage 124 via the joint 122. At this time, because the throttle valve element 149 is provided in the joint 122, the throttle valve element 149 separates from (moves away from) the taper portion 145 (the throttle valve seat) by the pressure of hydrogen gas flowing from the pipe 125-side to the supply passage 124-side, with the result that the opening area of the throttle valve orifice increases. Thus, a large amount of hydrogen gas is allowed to flow from the pipe 125-side to the supply passage 124-side, and therefore, hydrogen gas is quickly supplied to the gas tank.

The end faces of the filter 142 are respectively sealed by the gaskets 152. The gaskets 152 are generally made of a gasket material, such as rubber, synthetic resin and metal. One of the gaskets 152 is disposed between the support member 143 and the filter 142, and the other one of the gaskets 152 is disposed between the filter 142 and the valve chamber forming member 150. Each of the gaskets 152 is sandwiched between the members made of metal. The filter 142 and the valve chamber forming member 150 are not fixed to the joint body 140. Therefore, the gaskets 152 are squashed when the throttle valve element 149 is moved in the valve opening direction to press the valve chamber forming member 150 due to gas pressure at the time of supplying gas. As a result, the gaskets 152 may be excessively squashed.

SUMMARY OF THE INVENTION

The invention provides a throttle valve in which gaskets respectively disposed on both ends of a filter are not squashed when a throttle valve element moves in a valve opening direction.

A throttle valve according to an aspect of the invention includes a throttle valve element disposed in a throttle valve flow passage; a support member that supports the throttle valve element, the support member including a valve element support portion that supports the throttle valve element such that the throttle valve element is movable in a valve opening direction and a valve closing direction, and a shaft portion that is connected to the valve element support portion, the shaft portion having a gas passage that extends in an axis direction and an inlet port through which gas is introduced into the gas passage, the inlet port being provided in an outer peripheral surface of the shaft portion; a mounting member that mounts the support member in the throttle valve flow passage; a filter that is disposed on the outer peripheral surface of the shaft portion to cover the inlet port, in a space whose axial length is defined by the shaft portion and the mounting member; and gaskets that are respectively disposed between one axial end of the filter and the mounting member and between the other axial end of the filter and the shaft portion.

With the above-mentioned configuration, the gaskets are respectively sandwiched between one axial end of the filter and the mounting member and between the other axial end of the filter and the shaft portion to seal end faces of the filter. Because the filter and the gaskets are disposed in the space whose axial length is defined by the shaft portion and the mounting member, when the throttle valve element moves in the valve opening direction, the gaskets respectively disposed on both ends of the filter are not squashed.

The shaft portion may include a columnar portion connected to the valve element support portion, a tubular portion connected to the columnar portion, and a fitting portion connected to the tubular portion and fitted to the mounting member; the columnar portion, the tubular portion, and the fitting portion may be arranged in a stated order from an upstream of the throttle valve flow passage toward a downstream of the throttle valve flow passage; and the gas passage may be provided in the tubular portion and the fitting portion.

With the above-mentioned configuration, when the throttle valve element moves in the valve opening direction, the gaskets that respectively seal both ends of the filter that covers the inlet port of the tubular portion are not squashed.

According to the aspect of the invention, when the throttle valve element moves in the valve opening direction, the gaskets respectively disposed on both ends of the filter are not squashed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
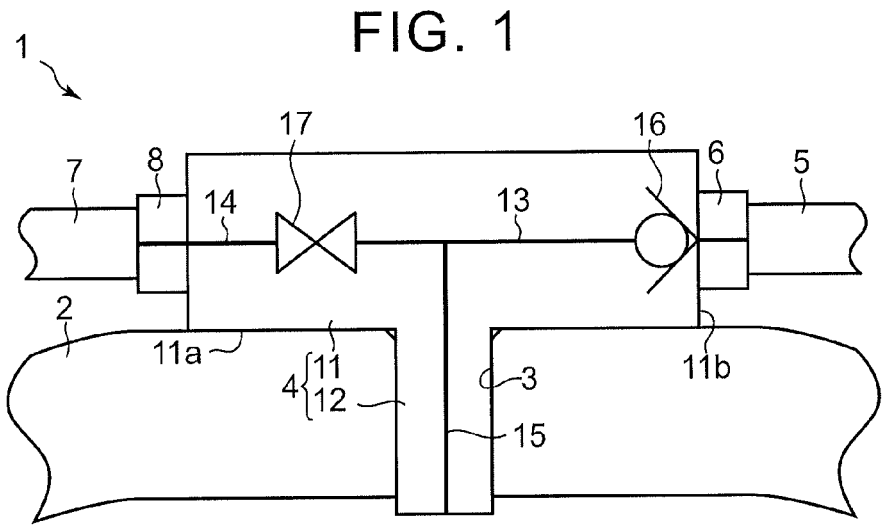
FIG. 1 is a view showing a schematic configuration of a valve device.

Hereinafter, a valve device including a throttle valve element according to a first embodiment will be described with reference to FIG. 1 to FIG. 3. A valve device 1 shown in FIG. 1 is fitted to a fitting opening 3 of a gas tank 2 in which hydrogen gas at a high pressure (for example, 70 MPa) is stored. The valve device 1 includes a body 4 (valve body) formed of aluminum alloy, a supply-side joint 6, and a delivery-side joint 8. The supply-side joint 6 serves as a joint that connects, to the valve device 1, a supply pipe (pipe) 5 extending from a supply source that supplies hydrogen gas. The delivery-side joint 8 connects, to the valve device 1, a delivery pipe 7 extending to a destination to which the hydrogen gas is delivered (i.e., a delivery destination), for example, a fuel cell. The body 4 includes a body portion 11 having a flat box shape, which is disposed outside the gas tank 2, and a fitting portion 12 that is inserted into the fitting opening 3. The fitting portion 12 has a circular columnar shape, and extends in a direction substantially orthogonal to a bottom surface 11a of the body portion 11 (i.e., in a downward direction in FIG. 1).

In the body portion 11, a supply passage 13 and a delivery passage 14 are provided. The supply passage 13 is provided to supply the hydrogen gas flowing from the supply pipe 5, into the gas tank 2. The delivery passage 14 is provided to deliver the hydrogen gas to the delivery destination such as a fuel cell via the delivery pipe 7. In the fitting portion 12, a connection passage 15 is provided. The connection passage 15 is connected to each of the supply passage 13 and the delivery passage 14, and is opened to the inside of the gas tank 2. That is, in the embodiment, the supply passage 13 and the connection passage 15 constitute a gas flow passage that provides communication between the inside and the outside of the gas tank 2. In the supply passage 13, a check valve 16 is provided. The check valve 16 suppresses the discharge (release) of the hydrogen gas, which has been supplied into the gas tank 2, to the outside of the body 4 (the outside of the valve device 1). In the delivery passage 14, a solenoid valve 17 is provided. The solenoid valve 17 controls the supply of the hydrogen gas to the delivery destination. In the valve device 1, the supply pipe 5 is connected to the supply-side joint 6 such that the supply pipe 5 is connected to the supply passage 13, and the delivery pipe 7 is connected to the delivery-side joint 8 such that the delivery pipe 7 is connected to the delivery passage 14.

Next, the configuration of connection portions of the body 4 and the supply-side joint 6 and the vicinity of the connection portions will be described. As shown in FIG. 2, a side surface 11b of the body portion 11, that is, the outer surface of the body portion 11 has a circular fitting hole 21 that extends in a direction substantially orthogonal to the side surface 11b (i.e., in a right-left direction in FIG. 2). The fitting hole 21 includes a first fitting hole 22 that is opened at the side surface 11b, and a second fitting hole 23 that is coaxial with, and adjacent to the first fitting hole 22. The inside diameter of the first fitting hole 22 is larger than the inside diameter of the second fitting hole 23.

An internal thread (female thread) is provided on the inner peripheral surface of each of the first fitting hole 22 and the second fitting hole 23. The supply-side joint 6 is screwed to the first fitting hole 22, and thus, the supply-side joint 6 is fitted to the first fitting hole 22. A positioning member 86 (described later) is screwed to the second fitting hole 23, and thus, the positioning member 86 is fitted to the second fitting hole 23.

The supply passage 13 linearly extends such that the supply passage 13 is coaxial with the first fitting hole 22 and the second fitting hole 23 in the vicinity of the side surface 11b of the body portion 11. The supply passage 13 is opened to the bottom surface of the second fitting hole 23. Thus, the inside of the fitting hole 21 communicates with the supply passage 13. In the supply passage 13, the above-mentioned check valve 16 is provided.

The configuration of the supply-side joint 6 will be described in detail. The supply-side joint 6 includes a cylindrical joint body 31. In a through-hole 32 extending through the joint body 31 in the axial direction of the joint body 31, a support member 33, a throttle valve 34, a filter 35, a plug 36, and a seal member 37 are disposed. The through-hole 32 is formed such that the through-hole 32 is coaxial with the supply passage 13 in a state where the joint body 31 is fitted to the first fitting hole 22.

Figure 3:
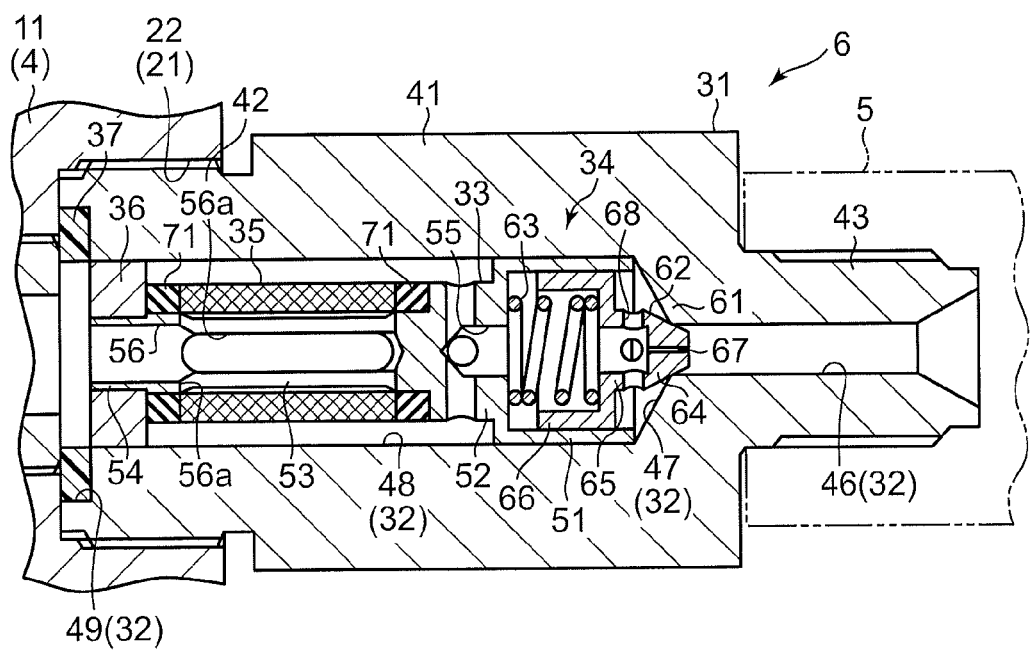
FIG. 3 is an enlarged sectional view showing the supply-side joint in the first embodiment.

More specifically, as shown in FIG. 3, the joint body 31 includes a grip portion 41 gripped (held) by a tool or the like, a body-side connection portion 42 extending from the grip portion 41 toward one end side (a left side in FIG. 3), and a pipe-side connection portion 43 extending from the grip portion 41 toward the other end side (a right side in FIG. 3). Parts of the outer peripheral surface of the grip portion 41 are chamfered such that the cross section of the grip portion 41 in a direction orthogonal to the axial direction has a hexagonal shape. An external thread (a male thread) that is screwed to the internal thread of the first fitting hole 22 is provided on the outer peripheral surface of the body-side connection portion 42. An external thread (a male thread) that is screwed to an internal thread provided on the inner peripheral surface of the supply pipe 5 is provided on the outer peripheral surface of the pipe-side connection portion 43. Thus, by screwing the body-side connection portion 42 to the first fitting hole 22, the joint body 31 is fitted such that the grip portion 41 and the pipe-side connection portion 43 protrude from the side surface 11b of the body portion 11.

The through-hole 32 provided in the joint body 31 includes a small-diameter hole portion 46, a taper hole portion 47, a large-diameter hole portion 48, and an increased-diameter hole portion 49 that are arranged in the stated order from the pipe-side connection portion 43-side (the right side in FIG. 3) toward the body-side connection portion 42-side. The small-diameter hole portion 46 extends from the end face of the pipe-side connection portion 43 to the grip portion 41, and the inside diameter of the small-diameter hole portion 46 is smaller than the inside diameter of each of the other portions of the through-hole 32.

The large-diameter hole portion 48 extends from the end face of the body-side connection portion 42 to a position in the grip portion 41, the position being close to the pipe-side connection portion 43. The inside diameter of the large-diameter hole portion 48 is larger than the inside diameter of the small-diameter hole portion 46, and is smaller than the inside diameter of the increased-diameter hole portion 49. The taper hole portion 47 is disposed between the large-diameter hole portion 48 and the small-diameter hole portion 46. The inside diameter of the taper hole portion 47 gradually increases in a direction from the small-diameter hole portion 46 toward the large-diameter hole portion 48. The inside diameter of the increased-diameter hole portion 49 is larger than the inside diameter of each of the other portions the through-hole 32. The increased-diameter hole portion 49 is opened at the end face of the body-side connection portion 42. The large-diameter hole portion 48 of the through-hole 32 corresponds to a throttle valve flow passage.

As shown in FIG. 3, the support member 33 is disposed inside the large-diameter hole portion 48. The support member 33 includes a valve chamber forming portion 51, a columnar portion 52, a tubular portion 53 and a fitting portion 54. The valve chamber forming portion 51, the columnar portion 52, the tubular portion 53 and the fitting portion 54 are provided in the stated order from the pipe-side connection portion 43-side (in FIG. 3, the right side). The valve chamber forming portion 51 has a cylindrical shape. The outside diameter of the valve chamber forming portion 51 is substantially equal to the inside diameter of the large-diameter hole portion 48. The valve chamber forming portion 51 is disposed so as to contact the largest diameter portion (in other words, the portion with the largest diameter, that is, in FIG. 3, the left-side large-diameter end portion) of the taper hole portion 47.

The valve chamber forming portion 51 corresponds to a valve element support portion that supports a throttle valve element 62 via an urging member 63 (described later). The columnar portion 52, the tubular portion 53 and the fitting portion 54 correspond to a shaft portion connected to the valve chamber forming portion 51 (a valve element support portion).

The columnar portion 52 has a circular columnar shape. The outside diameter of the columnar portion 52 is smaller than the outside diameter of the valve chamber forming portion 51. The columnar portion 52 has a flow passage 55. The flow passage 55 extends through the columnar portion 52 in a radial direction of the columnar portion 52, and is opened to the inside of the valve chamber forming portion 51. The tubular portion 53 has a cylindrical shape. The outside diameter of the tubular portion 53 is smaller than the outside diameter of the columnar portion 52. The fitting portion 54 has a cylindrical shape. The outside diameter of the fitting portion 54 is slightly smaller than the outside diameter of the tubular portion 53. Thus, the tubular portion 53 has a step face at the fitting portion 54-side axial end portion. The support member 33 is fitted and fixed in the large-diameter hole portion 48 (the throttle valve flow passage) in the following manner. The step face is disposed so as to contact the plug 36, and, as described above, the valve chamber forming portion 51 contacts the largest diameter portion of the taper hole portion 47.

A gas passage 56 is provided in the tubular portion 53 and the fitting portion 54 so as to extend in an axis direction of the tubular portion 53 and the fitting portion 54 (that is, an axis direction of the shaft portion), and a plurality of inlet ports 56a that communicate with the gas passage 56 are provided in the outer peripheral surface of the tubular portion 53. In the embodiment, the inlet ports 56a are elongate holes formed to extend along the axis direction. The inlet ports are not limited to elongate holes. For example, a plurality of circular holes may be arranged in line, in a staggered manner, or the like. The gas passage 56 is opened at the supply passage 13-side end face of the fitting portion 54.

The throttle valve 34 is disposed inside the valve chamber forming portion 51. The throttle valve 34 includes a throttle valve element 62 that makes contact with and separates from a throttle valve seat 61 that is a border portion between the small-diameter hole portion 46 and the taper hole portion 47, and an urging member 63 (for example, a coil spring) that urges the throttle valve element 62 toward the throttle valve seat 61. In the embodiment, the taper hole portion 47-side end (i.e., the taper hole portion 47-side opening) of the small-diameter hole portion 46 functions as a valve orifice of the throttle valve seat 61 (i.e., a throttle valve orifice).

The throttle valve element 62 includes a valve portion 64, a cylindrical portion 65, and an accommodation tube portion 66 that are arranged in the stated order from the throttle valve seat 61-side (the right side in FIG. 3). The valve portion 64 has a taper shape, that is, the outside diameter of the valve portion 64 decreases in a direction away from the cylindrical portion 65. The outside diameter of the largest portion of the valve portion 64 is smaller than the inside diameter of the large-diameter hole portion 48, and is larger than the inside diameter of the small-diameter hole portion 46. The outside diameter of the smallest portion (i.e., the portion having the smallest diameter) of the valve portion 64 is smaller than the inside diameter of the small-diameter hole portion 46. The valve portion 64 has a fine hole 67. The fine hole 67 is opened at a center of the distal end of the valve portion 64 and is opened to the inside of the cylindrical portion 65. The cylindrical portion 65 has a cylindrical shape, and the outside diameter of the cylindrical portion 65 is smaller than the inside diameter of the valve chamber forming portion 51.

In the cylindrical portion 65, a plurality of side holes 68 are provided. The side holes 68 extend through the cylindrical portion 65 from the inside of the cylindrical portion 65 to the outside of the cylindrical portion 65. The side holes 68 communicate with the fine hole 67. The accommodation tube portion 66 has a cylindrical shape such that the accommodation tube portion 66 is slidable with respect to the valve chamber forming portion 51 in an axis direction of the valve chamber forming portion 51. That is, the outside diameter of the accommodation tube portion 66 is substantially equal to the inside diameter of the valve chamber forming portion 51. The inside diameter of the accommodation tube portion 66 is larger than the outside diameter of the cylindrical portion 65. The urging member 63 in an axially compressed state is accommodated in the accommodation tube portion 66. More specifically, the urging member 63, which has been brought to the axially compressed state from a state where the length of the urging member 63 is a natural length and the force is not accumulated in the urging member 63, is accommodated in the accommodation tube portion 66. The throttle valve element 62 is urged toward the throttle valve seat 61 by the urging member 63.

As shown in FIG. 3, the filter 35 is formed to have a cylindrical shape so as to be adapted to the outer peripheral shape of the tubular portion 53, and is fitted to the outer peripheral surface of the tubular portion 53. That is, as described above, because the outside diameter of the tubular portion 53 is smaller than the outside diameter of the columnar portion 52, a space is formed outside the outer peripheral surface of the tubular portion 53 at a position between the columnar portion 52 and the plug 36 (described later). The filter 35 is disposed in the space. The inside diameter of the filter 35 is substantially equal to the outside diameter of the tubular portion 53 of the support member 33, and the outside diameter of the filter 35 is smaller than the inside diameter of the large-diameter hole portion 48. The filter 35 according to the embodiment is formed of a metal mesh (wire mesh). The filter 35 is disposed to face the inlet ports 56a of the tubular portion 53 in the radial direction so as to cover the inlet ports 56a in a state where annular gaskets 71 are respectively disposed on both sides of the filter 35 in the axial direction. As shown in FIG. 3, the paired gaskets 71 are disposed in the space, and are respectively fitted to the outer peripheries of both end portions of the tubular portion 53. The gaskets 71 are made of a material having sealing ability when the gaskets 71 are compressed. For example, the gaskets 71 are made of rubber, synthetic resin or metal.

The plug 36 has an annular shape. The outer periphery of the plug 36 is fitted and fixed to the large-diameter hole portion 48 with an interference. The inside diameter of the plug 36 is slightly larger than the outside diameter of the fitting portion 54. The outer periphery of the fitting portion 54 of the support member 33 is fitted in the plug 36 with a clearance. The clearance is set to approximately several tens of micrometers; however, the clearance is not limited to this value. In this way, the support member 33 is fitted to the joint body 31. The plug 36 corresponds to a mounting member.

The gaskets 71 respectively provided on both sides of the filter 35 in the axial direction are disposed in a state where the gaskets 71 are compressed by the plug 36. That is, as shown in FIG. 3, one of the gaskets 71 is sandwiched between one axial end of the filter 35 and the plug 36, and the other one of the gaskets 71 is sandwiched between the other axial end of the filter 35 and the columnar portion 52. Thus, the end faces of the filter 35 are sealed.

The seal member 37 has an annular shape, and is fitted to the increased-diameter hole portion 49. The seal member 37 is formed of an elastic material such as polyimide resin. The seal member 37 is interposed (sandwiched) between the joint body 31 and the body portion 11 in the state where the joint body 31 (the supply-side joint 6) is fitted to the first fitting hole 22. Thus, the seal member 37 is in close contact with each of the joint body 31 and the body portion 11, and provides airtight sealing between the joint body 31 and the body portion 11 (the fitting hole 21).

Next, the configuration of the check valve 16 will be described in detail. As shown in FIG. 2, the supply passage 13 includes an increased diameter portion 81 and a valve accommodation portion 82 that are provided in the fitting hole 21-side end portion of the supply passage 13. The increased diameter portion 81 is opened to the bottom surface of the second fitting hole 23. The valve accommodation portion 82 is adjacent to the increased diameter portion 81, and the check valve 16 is accommodated in the valve accommodation portion 82. The inside diameter of the valve accommodation portion 82 is smaller than the inside diameter of the increased diameter portion 81, and is larger than the inside diameter of the other portion of the supply passage 13, which is adjacent to the valve accommodation portion 82. The inner peripheral surface of the valve accommodation portion 82 is subjected to anodizing treatment.

The check valve 16 includes a check valve seat 83 that serves as a valve seat, a check valve element 84 that makes contact with and separates from the check valve seat 83, and an urging member 85 (for example, a coil spring) that urges the check valve element 84 toward the check valve seat 83. Further, the check valve 16 in the embodiment includes the positioning member 86 that sets the position of the check valve seat 83 in the supply passage 13, that is, the gas flow passage.

The check valve seat 83 is formed of an elastic material such as polyimide resin, and has an annular shape. The check valve seat 83 is fitted in the increased diameter portion 81. A check valve orifice 87 that extends through the check valve seat 83 in the axial direction is provided at a center of the check valve seat 83. The check valve orifice 87 is formed such that the check valve orifice 87 is disposed coaxially with the supply passage 13 in a state where the check valve seat 83 is fitted to the increased diameter portion 81.

The check valve element 84 is formed of stainless steel. The check valve element 84 includes a block portion 91, a small-diameter tube portion 92, a large-diameter tube portion 93, and a support portion 94 that are arranged in the stated order from the check valve seat 83-side (the right side in FIG. 2). The block portion 91 has a taper shape, that is, the outside diameter of the block portion 91 decreases in a direction away from the small-diameter tube portion 92. Each of the small-diameter tube portion 92, the large-diameter tube portion 93, and the support portion 94 has a cylindrical shape. The small-diameter tube portion 92, the large-diameter tube portion 93, and the support portion 94 constitute a hollow shaft. In other words, the portion of the check valve element 84, which consists of the small-diameter tube portion 92, the large-diameter tube portion 93, and the support portion 94, is in the form of a hollow shaft. The outside diameter of the largest portion of the block portion 91 is smaller than the inside diameter of the valve accommodation portion 82, and is larger than the inside diameter of the check valve orifice 87 of the check valve seat 83. The outside diameter of the smallest portion of block portion 91 is smaller than the inside diameter of the check valve orifice 87. When the distal end of the block portion 91 is inserted in the check valve orifice 87 and thus the check valve element 84 is seated at the check valve seat 83, the check valve element 84 closes the check valve orifice 87. When the check valve element 84 separates from the check valve seat 83, the check valve element 84 opens the check valve orifice 87. That is, the check valve element 84 closes and opens the supply passage 13 (the gas flow passage) by making contact with and separating from the check valve seat 83.

The outside diameter of the small-diameter tube portion 92 is smaller than the inside diameter of the valve accommodation portion 82. The small-diameter tube portion 92 has a plurality of side holes 95. The side holes 95 extend through the small-diameter tube portion 92 from the inside of the small-diameter tube portion 92 to the outside of the small-diameter tube portion 92. The outside diameter of the large-diameter tube portion 93 is substantially equal to the inside diameter of the valve accommodation portion 82. The outside diameter of the support portion 94 is slightly smaller than the outside diameter of the large-diameter tube portion 93.

The check valve seat 83-side end of the urging member 85 is fitted to the outer periphery of the support portion 94 of the check valve element 84. The urging member 85 in an axially compressed state is accommodated together with the check valve element 84 in the valve accommodation portion 82. More specifically, the urging member 85, which has been brought to the axially compressed state from a state where the length of the urging member 85 is a natural length and the force is not accumulated in the urging member 85, is accommodated together with the check valve element 84 in the valve accommodation portion 82. Thus, the check valve element 84 is urged toward the check valve seat 83 by the urging member 85.

Figure 2:
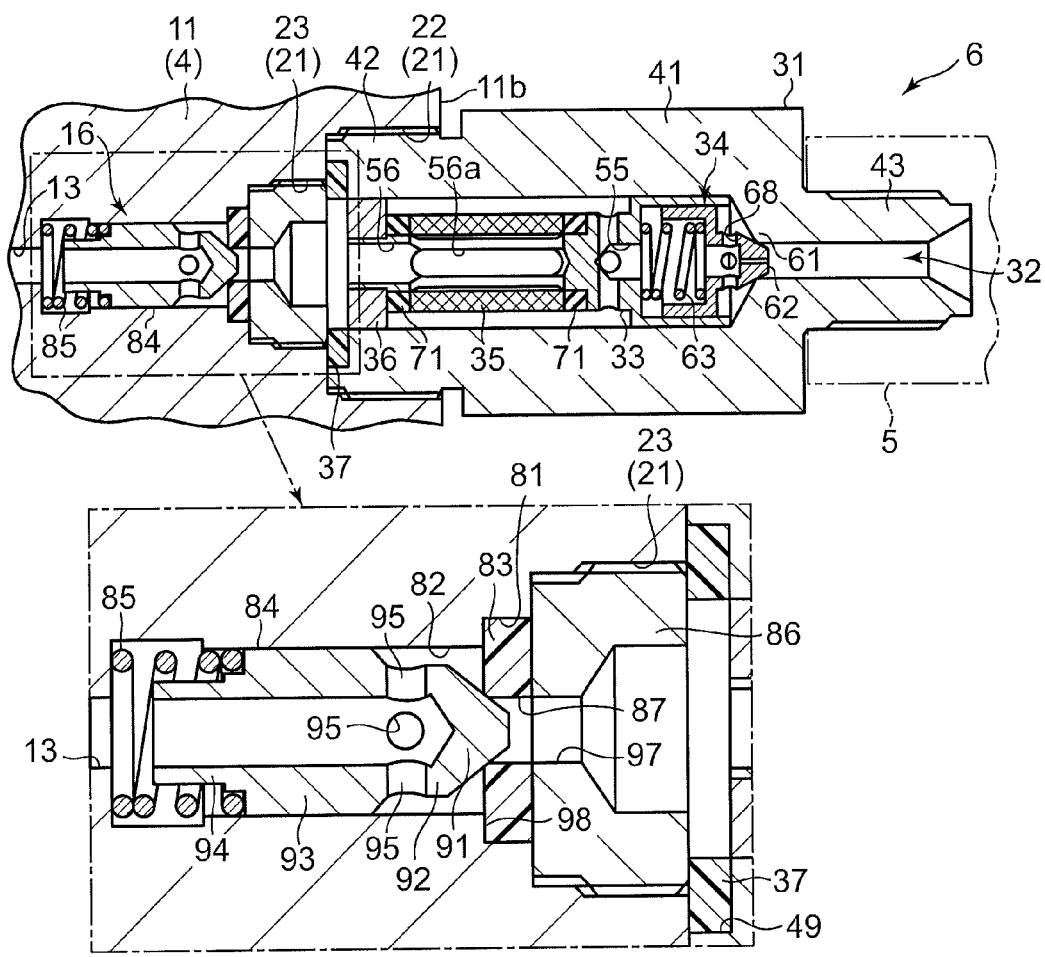
FIG. 2 is a partial sectional view showing connection portions of a body and a supply-side joint in a first embodiment of the invention.

As shown in FIG. 2, the positioning member 86 has an annular shape. An external thread (a male thread) is provided on the outer periphery of the positioning member 86. The external thread of the positioning member 86 is screwed to the internal thread of the second fitting hole 23. The positioning member 86 has a communication hole 97 that extends through the positioning member 86 in the axial direction. The communication hole 97 is disposed coaxially with the supply passage 13 in a state where the positioning member 86 is fitted to the second fitting hole 23. The supply passage 13 communicates with the through-hole 32 of the supply-side joint 6 (the joint body 31) via the communication hole 97. Thus, the supply-side joint 6 and the positioning member 86 are fitted to the fitting hole 21 (the first fitting hole 22 and the second fitting hole 23) such that the supply-side joint 6 and the positioning member 86 are coaxially arranged in the stated order from the outer side (i.e., the side surface 11b-side) of the body 4 (the body portion 11).

The length of the positioning member 86 in the axial direction is substantially equal to the depth of the second fitting hole 23 (i.e., the length of the second fitting hole 23 in the right-left direction in FIG. 2). Thus, the positioning member 86 does not protrude into first fitting hole 22 in a state where the positioning member 86 is fitted to the second fitting hole 23. That is, the positioning member 86 does not overlap with the supply-side joint 6 in the radial direction of the fitting hole 21. In other words, the axial position of the positioning member 86 does not overlap with the axial direction of the supply-side joint 6 in the axial direction (i.e., in the depth direction) of the fitting hole 21.

In the state where the positioning member 86 is fitted to the second fitting hole 23, the positioning member 86 presses the check valve seat 83 to a connecting surface 98 between the increased diameter portion 81 and the valve accommodation portion 82 (i.e., the connecting surface 98 connecting the inner peripheral surface of the increased diameter portion 81 and the inner peripheral surface of the valve accommodation portion 82 that have inside diameters different from each other), thereby setting (fixing) the position of the check valve seat 83 in the supply passage 13 (the gas flow passage). That is, the position of the check valve seat 83 in the supply passage 13 is set (fixed) by the positioning member 86 that is a member formed separately from the supply-side joint 6. Thus, even in a state where the supply-side joint 6 is not fitted to the fitting hole 21, the positioning member 86 is able to set the position of the check valve seat 83 in the supply passage 13. Further, the check valve seat 83 is interposed between the positioning member 86 and the body portion 11 (the valve accommodation portion 82). In other words, the check valve seat 83 is disposed in a region defined by the positioning member 86 and the body portion 11 (the increased diameter portion 81). Thus, the check valve seat 83 is in close contact with each of the body portion 11 and the positioning member 86, and the check valve seat 83 provides airtight sealing between the body portion 11 and the positioning member 86.

(Operation in the First Embodiment) Next, the operation of the valve device according to the embodiment will be described. When hydrogen gas is supplied into the gas tank 2, the supply pipe 5 is connected to the supply-side joint 6 such that the hydrogen gas is delivered into the supply-side joint 6 as shown in FIG. 2. At this time, the throttle valve element 62 of the throttle valve 34 moves toward the body 4 (in a valve opening direction) against the urging force of the urging member 63, and thus, the throttle valve element 62 separates from the throttle valve seat 61.

Thus, a large amount of hydrogen gas flows into the check valve orifice 87 via the small-diameter hole portion 46, the side holes 68, the inside of the valve chamber forming portion 51, the flow passage 55, the outside of the filter 35, the inside of the filter 35, the inlet ports 56a, the inside of the gas passage 56 shown in FIG. 3 and the communication hole 97 shown in FIG. 2. Due to the pressure of hydrogen gas, the check valve element 84 of the check valve 16 moves toward the inner side of the supply passage 13 against the urging force of the urging member 85, and separates from (moves away from) the check valve seat 83. Thus, hydrogen gas passes through the inside of the valve accommodation portion 82, the side holes 95 of the check valve element 84, the inside of the check valve element 84 and the supply passage 13, and is supplied into the gas tank 2.

When hydrogen gas is supplied, the throttle valve element 62 moves in the valve opening direction from the valve closed state against the urging force of the urging member 63, and therefore, the pressure of hydrogen gas at that time and the urging force of the urging member 63 are applied to the valve chamber forming portion 51 of the support member 33.

However, the step face at the fitting portion 54-side axial end portion of the tubular portion 53 contacts the plug 36 and the valve chamber forming portion 51 shown in FIG. 3 contacts the largest diameter portion (the left-side large-diameter end) of the taper hole portion 47 such that the support member 33 is fixed in the large-diameter hole portion 48 (the throttle valve flow passage). Thus, because the support member 33 is fixed in its axial direction, the gaskets 71 disposed in the space are not squashed. That is, when the throttle valve element 62 moves in the valve opening direction, the gaskets 71 respectively disposed on both ends of the filter 35 are not squashed.

When hydrogen gas is not supplied into the gas tank 2, the check valve element 84 shown in FIG. 2 is urged toward the check valve seat 83 due to the pressure of the hydrogen gas in the gas tank 2 (the supply passage 13) and the urging force of the urging member 85, and thus, the check valve element 84 is seated at the check valve seat 83. Thus, the check valve orifice 87 of the check valve seat 83 is closed, and the discharge (release) of the hydrogen gas from the gas tank 2 to the outside of the body 4 is suppressed. The throttle valve element 62 is seated at the throttle valve seat 61 due to the urging force of the urging member 63. As described above, the throttle valve element 62 has the fine hole 67. Therefore, even in a state where the throttle valve element 62 is seated at the throttle valve seat 61, the flow of the hydrogen gas is not completely blocked.

Thus, the throttle valve 34 functions as an excess flow stop valve that allows a small amount of hydrogen gas to flow from the large-diameter hole portion 48 to the small-diameter hole portion 46. Therefore, for example, when damage or the like occurs in the check valve element 84, a small amount of hydrogen gas is discharged through the throttle valve 34, and thus, an operator can detect a failure in the valve device 1 (the check valve 16).

There may be a case where the operator accidentally removes the supply-side joint 6 (the joint body 31) from the fitting hole 21, for example, after hydrogen gas is supplied. Even in this case, the position of the check valve seat 83 is maintained, because the positioning member 86 remains screwed to the second fitting hole 23. Therefore, it is possible to suppress the occurrence of a situation where the check valve element 84 cannot tightly close the check valve orifice 87, or the check valve seat 83 cannot remain in close contact with each of the body portion 11 and the positioning member 86 due to the displacement of the position of the check valve seat 83. Thus, the function of the check valve 16 is maintained.

There may be a case where a vehicle collision or the like occurs and a vehicle wheel or the like hits the outer peripheral surface of the supply-side joint 6 in a direction substantially orthogonal to the axial direction of the supply-side joint 6. In this case, due to the impact caused by the collision with the vehicle wheel or the like, for example, the supply-side joint 6 may be deformed, and may be inclined in the first fitting hole 22. In this regard, in the valve device 1 according to the embodiment, the axial position of the supply-side joint 6 and the axial position of the positioning member 86 do not overlap with each other in the axial direction of the fitting hole 21. Therefore, when the supply-side joint 6 is inclined due to an impact, the supply-side joint 6 is unlikely to interfere with the positioning member 86. Further, in the valve device 1 according to the embodiment, the inside diameter of the second fitting hole 23 is smaller than the inside diameter of the first fitting hole 22 as described above, and there is a step (in other words, a level difference) between the inner peripheral surface of the first fitting hole 22 and the inner peripheral surface of the second fitting hole 23. Therefore, even when the first fitting hole 22 is deformed due to the impact, the deformation of the first fitting hole 22 is unlikely to influence the second fitting hole 23. Accordingly, even when a large impact is applied to the supply-side joint 6, the displacement of the position of the positioning member 86 in the second fitting hole 23 is suppressed.

Next, the advantageous effects of the embodiment will be described. (1) The throttle valve according to the embodiment includes the throttle valve element 62 disposed in the large-diameter hole portion 48 (the throttle valve flow passage), the support member 33 that supports the throttle valve element 62, and the plug 36 (the mounting member) that mounts the support member 33 in the large-diameter hole portion 48. The support member 33 includes the valve chamber forming portion 51 (the valve element support portion) that supports the throttle valve element 62 such that the throttle valve element 62 is movable in the valve opening direction and the valve closing direction, and the shaft portion that is connected to the valve chamber forming portion 51, the shaft portion having the gas passage 56 that extends in the axis direction and the inlet ports 56a through which gas is introduced into the gas passage 56, the inlet ports 56a being provided in the outer peripheral surface of the shaft portion. In the space whose axial length is defined by the shaft portion and the plug 36 (the mounting member), the filter 35 that covers the inlet ports 56a is disposed on the outer periphery of the shaft portion. The gasket 71 is disposed between one axial end of the filter 35 and the plug 36 (the mounting member), and the other gasket 71 is disposed between the other axial end of the filter 35 and the shaft portion. As a result, when the throttle valve element moves in the valve opening direction, the gaskets respectively disposed on both ends of the filter are not squashed.

(2) In the embodiment, the shaft portion includes the columnar portion 52, the tubular portion 53 and the fitting portion 54 (the fitting portion) fitted to the plug 36 (the mounting member) that are arranged in the stated order from the upstream of the large-diameter hole portion 48 (the throttle valve flow passage) toward the downstream of the large-diameter hole portion 48. The tubular portion 53 and the fitting portion 54 have the gas passage 56.

As a result, when the throttle valve element 62 moves in the valve opening direction, the gaskets 71 that respectively seal both ends of the filter 35 that covers the inlet ports 56a of the tubular portion 53 are not squashed.

(Second Embodiment) Next, a valve device according to a second embodiment will be described with reference to FIG. 4. For the sake of illustration, the portions that are the same or correspond to those in the first embodiment will be denoted by the same reference numerals in the first embodiment, and the descriptions thereof will be omitted.

Figure 4:
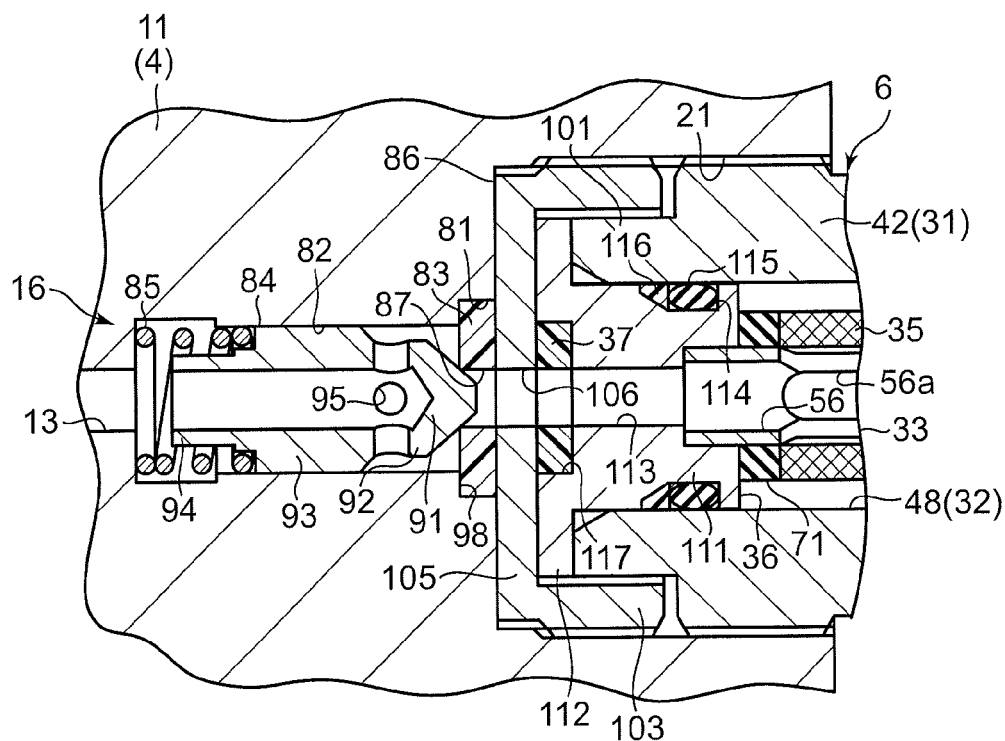
FIG. 4 is a partial sectional view showing connection portions of a body and a supply-side joint in a second embodiment of the invention.

As shown in FIG. 4, the inside diameter of the fitting hole 21 is substantially constant over the entire fitting hole 21 in the axial direction (i.e., in the depth direction) of the fitting hole 21. An internal thread (a female thread) is provided on the inner peripheral surface of the fitting hole 21. The joint body 31 of the supply-side joint 6 and the positioning member 86 are screwed to the internal thread, and thus, the joint body 31 and the positioning member 86 are fitted to the fitting hole 21. The joint body 31 includes a cylindrical extending portion 101 that further extends from the body-side connection portion 42.

The outside diameter of the extending portion 101 is smaller than the outside diameter of the body-side connection portion 42. The through-hole 32 of the joint body 31 does not include the increased-diameter hole portion 49 in the above-mentioned first embodiment. The positioning member 86 includes a tube portion 103 having a bottomed cylindrical shape. An external thread (a male thread) provided on the outer periphery of the tube portion 103 is screwed to the internal thread of the fitting hole 21. The inside diameter of the tube portion 103 is substantially equal to the outside diameter of extending portion 101 of the joint body 31. The extending portion 101 is inserted in the tube portion 103. That is, the positioning member 86 in the embodiment overlaps with the supply-side joint 6 in the radial direction of the fitting hole 21. In other words, the axial position of the positioning member 86 and the axial position of the supply-side joint 6 overlap with each other in the axial direction of the fitting hole 21. In a bottom portion 105 of the positioning member 86, a communication hole 106 is provided. The communication hole 106 extends through the bottom portion 105 in the axial direction of the positioning member 86. The communication hole 106 is formed such that the communication hole 106 is disposed coaxially with the supply passage 13 in the state where the positioning member 86 is fitted to the fitting hole 21.

The plug 36 includes an insertion portion 111, and a flange portion 112 that is provided on a side of the insertion portion 111, the side being close to the positioning member 86. An axial hole 113 that extends through the plug 36 in the axial direction of the plug 36 is provided at a center of the plug 36. The outside diameter of the insertion portion 111 is substantially equal to the inside diameter of the large-diameter hole portion 48 of the joint body 31, and the insertion portion 111 is fitted in the large-diameter hole portion 48. An annular groove 114 that extends in the circumferential direction of the insertion portion 111 is provided on the outer peripheral surface of the insertion portion 111. An O-ring 115 and a backup ring 116 are fitted to the annular groove 114. Thus, airtight sealing is provided between the plug 36 and the joint body 31. The outside diameter of the flange portion 112 is substantially equal to the inside diameter of the tube portion 103 of the positioning member 86. The flange portion 112 faces the extending portion 101 of the joint body 31 in the axial direction. An increased diameter hole portion 117 is provided in the flange portion 112-side end portion (i.e., the left end portion in FIG. 4) of the axial hole 113. The inside diameter of the increased diameter hole portion 117 is larger than the inside diameter of the other portion of the axial hole 113. The seal member 37 is fitted in the increased diameter hole portion 117.

In a state in which the joint body 31 is fitted to the fitting hole 21, the extending portion 101 presses the flange portion 112 such that the seal member 37 is interposed (sandwiched) between the plug 36 and the positioning member 86. Thus, the seal member 37 is in close contact with each of the plug 36 and the positioning member 86, and thus, airtight sealing is provided between the positioning member 86 and the plug 36.

According to the second embodiment, it is possible to obtain the effect of the first embodiment described in the above-mentioned section (1). Each of the above-mentioned embodiments may be appropriately modified. Modified examples of each of the above-mentioned embodiments will be described below.

Figure 5:
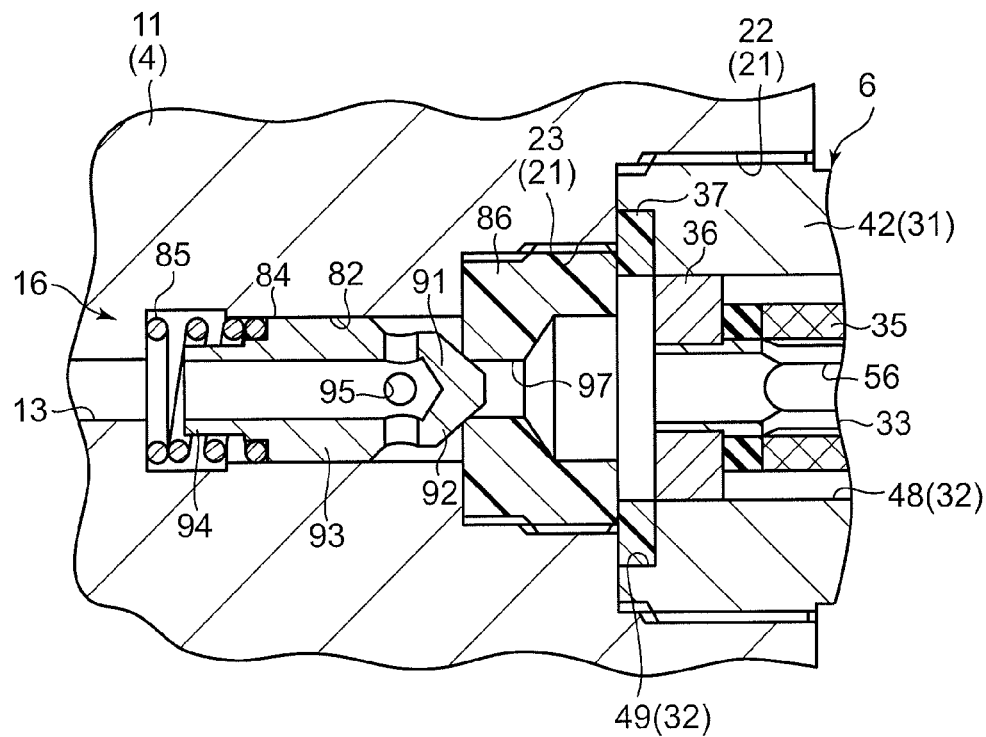
FIG. 5 is a partial sectional view showing connection portions of a body and a supply-side joint in another embodiment.
Figure 6:
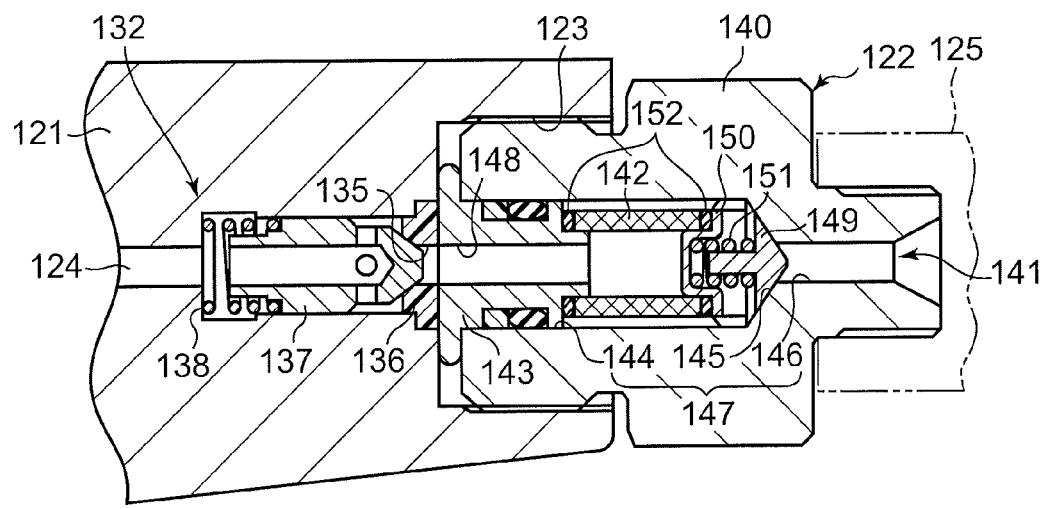
FIG. 6 is a partial sectional view showing connection portions of a body and a supply-side joint in related art.

In the first embodiment, the check valve 16 includes the annular check valve seat 83 that is a member formed separately from the positioning member 86. However, the invention is not limited to this configuration. For example, as shown in FIG. 5, the positioning member 86 may be formed of an elastic material such as polyimide resin, and the check valve element 84 may close and open the communication hole 97 of the positioning member 86 (i.e., the check valve orifice) by making contact with and separating from the positioning member 86. That is, the positioning member 86 may function also as the check valve seat. Similarly, in the second embodiment, the positioning member 86 may function also as the check valve seat.

In the example shown in FIG. 5, the positioning member 86 may be formed of soft metal that is elastically deformable, for example, brass or copper alloy. In each of the above-mentioned embodiments, each of the check valve seat 83 and the seal member 37 may be formed of soft metal.

In the above-mentioned embodiments, gas is hydrogen gas; however, gas is not limited to hydrogen gas. Gas other than hydrogen gas may be used. In the above-mentioned embodiments, the fine hole 67 may be omitted.

In the above-mentioned embodiments, the columnar portion 52 has the flow passage 55 that extends through the columnar portion 52 in the radial direction and that is opened to the inside of the valve chamber forming portion 51. Instead of this configuration, a flow passage may be formed so as to directly extend from the bottom wall of the valve chamber forming portion 51 to the gap between the columnar portion 52 and the large-diameter hole portion 48.

In the above-mentioned embodiments, the columnar portion 52 has a circular columnar shape; however, the columnar portion 52 is not limited to a circular columnar shape. The columnar portion 52 may be another columnar shape, such as a prismatic columnar shape. In the above-mentioned embodiments, each of the tubular portion 53 and the fitting portion 54 has a cylindrical shape; however, the shape of each of the tubular portion 53 and the fitting portion 54 is not limited to a cylindrical shape. The shape of each of the tubular portion 53 and the fitting portion 54 may be another tubular shape, such as a square tubular shape or a rectangular tubular shape.

In the above-mentioned embodiments, the filter 35 is formed to have a cylindrical shape so as to be adapted to the outer peripheral shape of the tubular portion 53. However, when the tubular portion 53 has a shape other than a cylindrical shape as described above, the filter 35 may be formed to have a tubular shape adapted to the outer peripheral shape of the tubular portion 53.

In the above-mentioned embodiments, each gasket 71 has an annular shape; however, the shape of each gasket 71 is not limited to an annular shape. Each of the gaskets 71 may be formed to have a loop shape that is adapted to the outer peripheral shape of a portion to which the gasket 71 is fitted, so as to seal the corresponding end face of the filter 35.

In the above-mentioned embodiments, the coil spring is used as each of the urging members 63, 85; however, each of the urging members 63, 85 is not limited to the coil spring. For example, a disc spring, an elastic body, or the like, may be used as each of the urging members 63, 85. When it is possible to urge the check valve element 84 toward the check valve seat 83 with the use of the pressure of hydrogen gas, the urging member 85 may not be provided. When it is possible to urge the throttle valve element 62 toward the throttle valve seat 61 with the use of the pressure of hydrogen gas, the urging member 63 may not be provided.

What is claimed is:

1. A throttle valve comprising:
   a throttle valve element disposed in a throttle valve flow passage;
   a support member that supports the throttle valve element, the support member including a valve element support portion that supports the throttle valve element such that the throttle valve element is movable in a valve opening direction and a valve closing direction, and a shaft portion that is connected to the valve element support portion, the shaft portion having (i) a longitudinal axis, (ii) a gas passage that extends in a direction of the longitudinal axis, and (iii) an inlet port through which gas is introduced into the gas passage, the inlet port being provided in an outer peripheral surface of the shaft portion;

a mounting member that mounts the support member in the throttle valve flow passage;

a filter that is disposed on the outer peripheral surface of the shaft portion and that covers the inlet port, in a space whose axial length is defined by the shaft portion and the mounting member; and gaskets that are respectively disposed between a first axial end of the filter and the mounting member, and between a second axial end of the filter and the shaft portion, the gaskets being made of a material having sealing ability when the gaskets are compressed, the material of the gaskets being one of rubber, synthetic resin, and metal, wherein:

the shaft portion of the support member includes a fitting portion extending into a passage of the mounting member so as to attach the support member to the mounting member, the gas passage extends through the fitting portion, a step is provided on one of: (i) an outer surface of the fitting portion, and (ii) an inner surface of the passage of the mounting member, and the fitting portion and the mounting member engage each other at the step to limit movement of the support member relative to the mounting member;

the shaft portion includes a columnar portion connected to the valve element support portion; and the columnar portion includes a flow passage having an inlet in communication with an inside of the valve element support portion, the flow passage extending in a radial direction relative to the longitudinal axis to at least one outlet on an outer periphery surface of the columnar portion.

2. The throttle valve according to claim 1, wherein:

the shaft portion includes a tubular portion connected to the columnar portion, and the fitting portion connected to the tubular portion and fitted to the mounting member;

the columnar portion, the tubular portion, and the fitting portion are arranged in order from an upstream side of the throttle valve flow passage toward a downstream side of the throttle valve flow passage; and the gas passage extends through the tubular portion and the fitting portion.

3. The throttle valve according to claim 2, wherein an outside diameter of the tubular portion is smaller than an outside diameter of the columnar portion, an outside diameter of the fitting portion is smaller than the outside diameter of the tubular portion, the filter is fitted to an outer peripheral surface of the tubular portion, and the gaskets are respectively fitted to outer peripheries of both end portions of the tubular portion.

\* \* \* \* \*